United States Patent [19]
Kajfež et al.

[11] 3,852,274
[45] Dec. 3, 1974

[54] DERIVATIVES OF 1,4-BENZODIAZEPIN-2-ONE AND METHODS FOR PREPARATION THEREOF

[75] Inventors: Franjo Kajfež; Tomislav Kovač; Vitomir Sunjic, all of Chiasso, Switzerland

[73] Assignee: CRC Compagnie Di Ricerca Chimica S.A., Chiasso, Switzerland

[22] Filed: Sept. 14, 1972

[21] Appl. No.: 289,143

[30] Foreign Application Priority Data
Sept. 15, 1971 Switzerland.................. 13498/71
May 26, 1972 Switzerland...................... 7856/72

[52] U.S. Cl............ 260/239.3 D, 424/244, 424/248, 424/251, 424/263, 424/267, 424/273, 424/274
[51] Int. Cl............................................ C07d 53/06
[58] Field of Search............................ 260/239.3 D

[56] References Cited
UNITED STATES PATENTS
| | | | |
|---|---|---|---|
| 3,198,789 | 8/1965 | Bell.............................. | 260/239.3 D |
| 3,296,249 | 1/1967 | Bell.............................. | 260/239.3 D |
| 3,450,695 | 6/1969 | Sternbach et al............ | 260/239.3 D |

FOREIGN PATENTS OR APPLICATIONS
| | | | |
|---|---|---|---|
| 1,022,642 | 3/1966 | Great Britain............... | 260/239.3 D |
| 1,034,872 | 7/1966 | Great Britain............... | 260/239.3 D |

OTHER PUBLICATIONS
Migrdichian, "Organic Synthesis" Reinhold, (1957) pages 76–79.

Bell et al. "J. Med. Chem." Vol. 11, pages 457–461 (1968).

*Primary Examiner*—Henry R. Jiles
*Assistant Examiner*—Robert T. Bond
*Attorney, Agent, or Firm*—Roditi, Schwartz & Nissen Waters

[57] ABSTRACT

1,4-Benzodiazepin-2-one derivatives having the formula

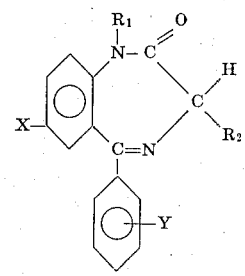

I.

wherein $R_1$ is H or $CH_3$
$R_2$ is an hydroxyalkoxy, tertiary amino or trihaloacetoxy group
X is H, halogen, alkoxy, $NO_2$ or $CF_3$ and
Y is H, halogen or $CF_3$ are prepared by reaction of the corresponding compound where $R_2$ is halogen with a polyalcohol or tertiary amine or the reaction of the corresponding compound where $R_2$ is hydroxy with a trihaloacetyl halide. The compounds are useful as tranquillizers and sedatives with improved solubility.

6 Claims, No Drawings

DERIVATIVES OF 1,4-BENZODIAZEPIN-2-ONE AND METHODS FOR PREPARATION THEREOF

This invention relates to derivatives of 1,4-benzodiazepin-2-one and to the preparation thereof.

It is well known that the derivatives of 1,4-benzodiazepine are, in general, good hypnotics, sedatives and tranquilizers. Their use in the medical field has been increasing during the past 10 years (LIBRIUM, VALIUM, MOGADON, NOBRIUM, ADUBRAN, etc.). However, all these medicinal preparations have a great disadvantage namely, that they have poor solubility in water, and, consequently, their use is limited to those forms which can be taken per os. However, quite to the contrary thereto, in the medical field there is very often a need for ampules which take effect very quickly. Moreoever, many of the known components have undesirably high toxicity.

Another problem in the field of 1,4-benzodiazepines has been in their preparation. Previously disclosed methods for the preparation of intermediate products of formula II (S.C. BELL et al, J. Org. Chem 27 , 1961 (1962), S. J. CHILDRESS et al, ibid. 33, 216 (1968), S. J. CHILDRESS et al, J. Med. Chem 11 , 457 (1968)), as well as an improved method by the above authors (R. Y. NINE, J. Org. Chem. 36 , 167 (1971)), did not achieve any satisfactory results in regard to the purity and yields of the products. For example, in the preparation of intermediate chloride compounds having the formula II (below), the chlorination step had previously been carried out at the reflux temperature of thionyl chloride, which resulted in the formation of some hydrochlorides. Excess thionyl chloride was removed by addition of concentrated or dilute aqueous ammonia, which further decreased the yield of the desired products due to hydrolysis.

It is therefore an object of the present invention to provide new derivatives of 1,4-benzodiazepin-2-ones which have a very high tranquilizing and sedative effect but possess a lower toxicity and higher solubility in water, water-gylcerol, or physiological solution than known 1,4-benzodiazepines. This latter property makes possible their use in the form of injections, syrups or drops, without the addition of various solubility-increasing substances which have various undesirable side effects.

The improved 1,4-benzodiazepin-2-one derivatives of the present invention have the formula

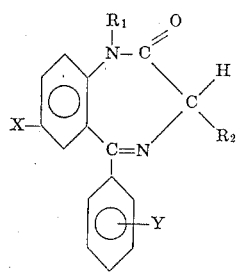

wherein
$R_1$ represents a hydrogen atom or an alkyl group, preferably having at most 4 carbon atoms in the chain
$R_2$ represents a hydroxyalkyl group having at most 6 carbon atoms in the chain and at least one hydroxyl group, whereby in the case of two vicinal hydroxyl groups, these can be ketalized with acetone to form an isopropylidenedioxy group; a trihaloacetoxy group; a tertiary alkyl amino-, a tertiary phenylamino-or mixed tertiary phenylalkylamino-group; a heterocyclic tertiary amino- or substituted heterocyclic tertiary amino- group; a 1-pyridyl group, which may be substituted in the 2, 3, 4 or 5 position, a 1-alkylmorpholino- or 1-phenyl-morpholino- group which may be substituted, whereby in case $R_2$ is one of the above-mentioned tertiary amino groups, compounds of the general formula I are in the form of quaternary ammonium salts;

X represents a hydrogen atom, a halogen atom, a methoxy group, a nitro group or a trifluoromethyl group and Y represents a hydrogen atom, a halogen atom or a trifluoromethyl group.

The compounds of formula I are prepared by reaction of compounds of the formula

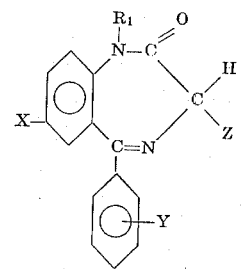

wherein $R_1$, X and Y have the same meaning as in Formula I and Z represents a halogen atom, with a polyalcohol (III), an α-halogen derivative of a carboxylic acid (IV) or a tertiary amine (V, VI or VII) as shown below:

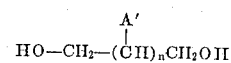

wherein A' represents a hydrogen atom or a hydroxyl group and n is a number from 0 to 4.

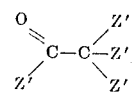

wherein Z' represents a halogen atom which may all be the same or different.

in which $R_3$, $R_4$ and $R_5$ represent alkyl or phenyl groups and may be the same or different.

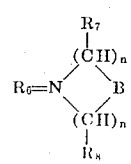

wherein

R₆ represents an alkyl radical having 1 to 4 carbon atoms in the chain, a phenyl group or substituted phenyl group R₇ and R₈ represent a hydrogen atom, an additional single bond, an alkyl group having 1 to 3 carbon atoms, a carboxyl group, a methoxy group, an hydroxy group, an ester group, an amide group or a nitro group and may be the same or different, the number or these groups being dependent on the value of n;

n is a number from 1 to 3;

B represents a methylene group, an ethylene group, a sulfur atom, an oxygen atom, an —NH— group wherein the hydrogen atom can be replaced by an alkyl group having up to 3 carbon atoms, an o-disubstituted phenyl group (which may contain other substituents). B may also be absent but only in the case where both $n$ integers are 1. In this case (when both $n=1$), when $R_7=R_8=H$, B is absent and $R_6=CH_3$, the compound is N-methylethylimine. When $n=2$, B is an oxygen atom, $R_7=R_8=H$ and $R_6=CH_3$, the compound is an N-methylmorpholine.

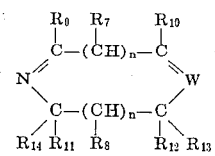

wherein R₇ and R₈ have the same meaning as in formula VI, R₉, R₁₀, R₁₁, R₁₂, R₁₃ and R₁₄ represent a hydrogen atom, a single bond, a N,N-diethylcarboxamide group, a thiosemicarbazonemethyl group, a carboxyl group, a carboxamide group, an ester group, alkoxy group having 1 to 3 carbon atoms or a nitro group wherein R₉, R₁₀, R₁₁ and R₁₂ may be the same or in any possible combination thereof, wherein, if only one group is present, all the above R's represent a hydrogen atom or a single bond, W represents a nitrogen atom or a methyne group and n is a number from 0 to 3.

So, for instance, if $n=0$, W=CH, R₉, R₁₀, and R₁₁= a hydrogen atom R₁₂= CONH₂, and R₁₃ and R₁₄ are an additional single bond, the compound in question is nicotinamide.

The reaction is conducted in an anhydrous inert solvent (dimethyl formamide, acetonitrile a.s.o.), or in a surplus of the reactants having the general formulae III to VII. The reaction is accomplished at room temperature, or at any temperature up to the boiling point of the reaction mixture. The best results are achieved at those temperatures which are disclosed in the Examples.

In case that the compounds having the general formula I are produced using the tertiary amines, these are in the form of quaternary ammonium salts.

The intermediate compounds of formula II are prepared by a new process which overcomes the difficulties of the prior art as mentioned previously.

The chlorinating method used herein is conducted at a temperature of —5°C and results in very pure products having the general formula II, and in the form of a free base. It is characterized in that the excess of thionyl chloride is removed by evaporation, the remaining traces of thionyl chloride are removed by evaporation with benzene under vacuum, and the high-purity product is crystallized directly from the evaporation residue by the addition of ether.

In preparing compounds of formula I wherein R₂ is

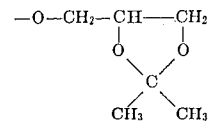

the reaction is carried out in an inert solvent, preferably in absolute benzene and in the presence of an acidic acceptor. Ag₂O was found to be the best acceptor.

When it is desired to produce the compounds having the formula I wherein R₂ is

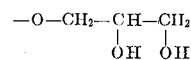

it is necessary to conduct a hydrolysis of the compounds having the general formula I wherein R₂ is

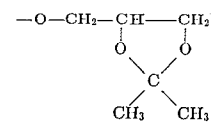

It is a known fact that the compounds having the general formula I are sensitive to acids, and, consequently, a series of experiments was carried out in order to determine the best conditions for the hydrolysis, using a 50% (pH 1), a 35% (pH 1), a 12% (pH 1), and a 5% (pH 1.5) formic acid.

If 55% formic acid is used at room temperature, the compound I wherein R₂ is

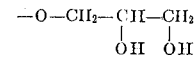

is produced within 15 minutes wherein, however, a spot from the decomposition product is seen in the thin-layer chromatogram, and an even larger amount of the decomposition product is produced after this moment.

If 12.5% formic acid is used, the reaction is very slow at room temperature, but the reaction terminates in 5 minutes at 80°C.

The best results were obtained when 12.5% formic acid was used at a temperature of 50°C, wherein the hydrolysis was quantitative in 30 minutes.

The same results were obtained with 5% formic acid, but after 1 hour.

The hydrolysis with acetic acid gave similar results. The best result was achieved with 30% acetic acid at a temperature of 50°C and after 30 minutes.

The hydrolysis with sulfuric acid (1:20 weight) at 50°C and for 30 minutes gave slightly worse results, since, in addition to the splitting-off of the isopropylidene group, the C—3 ester bond was also destroyed and other decomposition products resulted.

The following examples illustrate the invention in greater detail but are not intended to limit the scope thereof.

EXAMPLE 1

3,7-dichloro-1-methyl-1,3-dihydro-5-phenyl-2H-1,4-benzodiazepin-2-one 7-chloro-1-methyl-3-hydroxy-1,3-dihydro-5-phenyl-2H-1,4-benzodiazepin-2-one (TEMAZEPAM) (3g, appr. 10 mMol) were dissolved in 35 ml of freshly distilled thionyl chloride. The solution (clear and of light yellow color) was placed in a refrigerator for 48 hours. According to the thin-layer chromatogram (benzene-ether, 3:4 vol., HF—SiO$_2$, UV), the solution contained compound I (spot at R$_f$ approx. 0.75), trace of temazepam at R$_f$ approx. 0.40 and a trace of the hydrochloride of compound I at the beginning. The solution was evaporated (rotary evaporator). From the remaining viscous oil, approximately 700 mg were taken and purified on a SiO$_2$ column (approx. 30 g SiO$_2$, 0.05 – 0.2 mm $\phi$, column 70 × 0.9 cm with ether-benzene as eluent). Fractions 3–11 contained chromatographically pure 3,7-dichloro-1-methyl-1,3-dihydro-5-phenyl-2H-1,4-benzodiazepin-2-one, a clear, viscous oily substance which crystallized after addition of ether (in all 594 mg, 85% of the 700 mg which were put in). It was then suspended, filtered by suction and washed with ether. The product obtained was of analytical purity, m.p. 98.0° to 100.0°C.

| Analysis | $C_{16}H_{12}Cl_2N_2O$ | | (319.190) | |
|---|---|---|---|---|
| | Calculated | C 60.20%, | H 3.79%, | N 8.77% |
| | Found | C 60.43%, | H 3.67%, | N 8.77% |

Instead of purification on a column, the product can also be purified by recrystallization from benzene and precipitation with petroleum ether.

EXAMPLE 2

3,7-dichloro-1,3-dihydro-1-methyl-5-phenyl-2H-1,4-benzodiazepin-2-one 30 g (0.1 Mol) of 7-chloro-1,3-dihydro-3-hydroxy-1-methyl-5-phenyl-2H-1,4-benzodiazepin-2-one (TEMAZEPAM), m.p. 156°–158°C were slowly added to 30 ml of SOCl$_2$ (freshly distilled). The reaction mixture (a yellowish solution) was placed in a refrigerator for a period of 24 hours. The excess SOCl$_2$ was removed in a rotary evaporator (water bath max. 70°C). The viscous resinous yellowish residue was treated 4 times with 25 ml portions of anhydrous benzene and evaporated in order to remove the remaining SOCl$_2$. The yellowish residue was suspended in 140 ml of anhydrous ether. The product crystallized in the course of 2 to 3 hours with slight heating on a water bath (approx. max. 30°C). The precipitate was filtered by suction washed with a small amount of dry ether and dried in air for approx. 1 hour. Yield 31 g (98% of theory) of crystalline product. The product was stored in an evacuated container over NaOH.

| Analysis | $C_{16}H_{12}Cl_2N_2O$ | | (319.19) | |
|---|---|---|---|---|
| | Calculated: | C 60.20% | H 3.79% | N 8.77% |
| | Found: | C 60.43% | H 3.67% | N 8.77% |

EXAMPLE 3

3,7-dichloro-1,3-dihydro-5-phenyl-2H-1,4-benzodiazepin-2-one

Starting with 7-chloro-1,3-dihydro-3-hydroxy-5-phenyl-2H-1,4-benzodiazepin-2-one (OXAZEPAM) and using the same procedure as described in Example 1, the compound obtained was 3,7-dichloro-1,3-dihydro-5-phenyl-2H-1,4-benzodiazepin-2-one, the yield being 80%.

EXAMPLE 4

3,7-dichloro-1,3-dihydro-5-phenyl-2H-1,4-benzodiazepin-2-one.

30 g of 7-chloro-1,3-dihydro-5-phenyl-3-hydroxy-2H-1,4-benzodiazepin-2-one (OXAZEPAM) were slowly added to 70 ml of freshly distilled SOCl$_2$. The reaction was exothermic. The suspension was heated under gentle reflux (water bath 90°– 100°C) for 1 hour, and shaken from time to time. The excess SOCl$_2$ was removed (rotary evaporator, water bath max. 70°C). The remainder of the SOCl$_2$ was removed by addition of seven 20 ml portions of dry benzene with subsequent evaporation. The remaining yellow substance was suspended in approx. 100 ml of dry benzene and left at room temperature for 5–6 hours. The crystalline mixture was filtered by suction, washed with 50 ml of dry benzene and 50 ml of dry ether and dried in air for approx. 1 hour. The last traces of SOCl$_2$ were removed by leaving the substance in a vacuum desiccator over NaOH. There were obtained 29–31 g of light yellow product, m.p. 120°–122°C (yield 90–95% of theory).

EXAMPLE 5

3,7-dichloro-1,3-dihydro-5-o-chlorophenyl-2H-1,4-benzodiazepin-2-one

The procedure followed was the same as in Example 4, but the starting material was 30 g of 7-chloro-1,3-dihydro-3-hydroxy-5-o-chlorophenyl-2H-1,4-benzodiazepin-2-one (LORA-ZEPAM). There were obtained 33 g (98% of theory) of a crystalline product, m.p. 133°–138°C.

EXAMPLE 6

7-chloro-1-methyl-3-[(2′,3′-isopropylidendioxy)propoxy]-1,3-dihydro-5-phenyl-2H-1,4-benzodiazepin-2-one Crude 3,7-dichloro-1-methyl-1,3-dihydro-5-phenyl-2H-1,4-benzodiazepin-2-one was dissolved in 35 ml of absolute benzene, reacted with a solution of 1.2 g (9.1 mMol, approx. 15% excess) of isopropylidene glycerol in approx. 5 ml of absolute benzene, and, subsequently, with 2 g Ag$_2$O (8.7 mMol, approx. 10% excess). After approximately 16 hours of mixing at room temperature and in the dark, the Beilstein test was negative. The starting material was not identified in the thin-layer chromatogram. The silver chloride precipitate and the excess Ag$_2$O were filtered off and the benzene filtrate was evaporated. The remaining viscous oil, which soon crystallized, (approx. 4 g) was purified on a SiO₂ column (approx. 100 g SiO₂, 0.05 to 0.2 mm $\phi$, column 85 × 1.5 cm with ether-petroleum ether-methanol, 4:4:1 vol. as the eluent). Fractions 22–72 contained the chromatographically pure desired product. When evaporated, they yielded 2.3 g of a solid substance, m.p. 140°–142°C. A portion was recrystallized from ether by precipitation with petroleum ether (ratio ether-petroleum ether approx. 1:3 vol.). The product had a melting point of 144° to 146°C. By recrystallization in the same manner, analytically pure 7-chloro-1-methyl-3-[(2',3'-isopropylidenedioxy) propoxy] -5-phenyl-2H-1,4-benzodiazepin-2-one was produced, having a melting point of 146° to 148°C.

| Analysis | $C_{22}H_{23}ClN_2O_4$ | | (414.881) | |
|---|---|---|---|---|
| Calculated: | C 63.68%, | H 5.59%, | N 6.77% | |
| Found: | C 63.93%, | H 5.87%, | N 6.68% | |

EXAMPLE 7

7-chloro-1-methyl-3-[(2',3'-isopropylidenedioxy) propoxy]-1,3-dihydro-5-phenyl-2H-1,4-benzodiazepin-2-one 20 g (62.6 mMol) of 3,7-dichloro-1-methyl-5-phenyl-2H-1,4-benzodiazepin-2-one were added slowly with agitation to 40 ml of isopropylidene glycerol (b.p. 83°–84°C. / 13 mm Hg) at a temperature of 70°C. The orange-yellow viscous solution was left at room temperature for 4 hours. 150 ml of water were added to the reaction mixture and extracted 5 times with 50 ml portions of chloroform. The extract was washed with 100 ml of water and dried for 2 hours over anhydrous Na₂SO₄. After evaporation of the solvent the residue was dissolved in 150 ml of ethanol and precipitated by addition of 190 ml of water, and placed in the refrigerator for 24 hours. The amorphous white precipitate was filtered by suction and dried in air. There were obtained 17 g (75% of theory) of a white amorphous product, m.p. 115°–120°C. A mixture of 7-chloro-1-methyl-3-[(2',3'-isopropylidenedioxy) propoxy]-1,3-dihydro-5-phenyl-2H-1,4-benzodiazepin-2-one and 7-chloro-1-methyl-3- (2',3'-dihydroxypropoxy)-1,3-dihydro-5-phenyl-2H-1,4-benzodiazepin-2-one was obtained in the ratio 70:30. An analytically pure product having a melting point of 150°–152°C was obtained by chromatography on a column of silica gel. The eluent was a mixture of benzene-acetone (2:1).

| Analysis: | $C_{22}H_{23}ClN_2O_4$ | | (414.881) | |
|---|---|---|---|---|
| Calculated: | C 63.68% | H 5.95% | N 6.77% | |
| Found: | C 63.39% | H 5.84% | N 7.02% | |

The substance was very soluble in chloroform, benzene, acetone, ethanol, methanol and ethyl acetate. Slightly soluble in ether. Insoluble in water and petroleum ether. Thin-layer chromatography : ether-petroleum ether-methanol (4:4:1), HF-SiO₂, UV₂₅₄, $R_f \cong 0.85$.

Benzene-acetone (2:1), HF—SiO₂, UV₂₅₄, $R_f \cong 0.65$

EXAMPLE 8

7-chloro-1,3-dihydro-3-[(2',3'-isopropylidenedioxy) propoxy]-5-phenyl-2H-1,4-benzodiazepin-2-one.

Starting with 3,7-dichloro-1,3-dihydro-5-phenyl-2H-1,4-benzodiazepin-2-one and using the method in Example 1, the resulting product was 7-chloro-1,3-dihydro-3-[(2',3'-isopropylidenedioxy) propoxy]-5-phenyl-2H-1,4-benzodiazepine-2-one, having a melting point of 194° to 196°C, the yield being 80 to 83%.

EXAMPLE 9

7-chloro-1,3-dihydro-3-[(2',3'-isopropylidenedioxy) propoxy]-5-phenyl-2H-1,4-benzodiazepin-2-one.

10 g (31.8 mMol) of 3,7-dichloro-1,3-dihydro-5-phenyl-2H-1,4-benzodiazepin-2-one was slowly added with agitation at 70°C to 35 ml of isopropylidene glycerol (b.p. 83°–84°C/13 mm Hg). The viscous orange-red solution was held at room temperature for 4 hours (some 7-chloro-1,3-dihydro-3-[(2',3'-isopropylidenedioxy propoxy]-5-phenyl-2H-1,4-benzodiazepin2-one precipitated). 100 ml of water was added to the mixture and extracted 3 times with 50 ml portions of chloroform. This extract was washed with 50 ml water, and dried over anhydrous Na₂SO₄ for 2–3 hours. The evaporated residue was an oily substance, which crystallized after addition of 60 ml of ether-petroleum ether (1:1). The mixture was left at room temperature overnight, filtered by suction, washed with ether-petroleum ether (1:1) and dried in air. Yield: 9 g of light yellow crystals m.p. 175°–180°C. (It was a mixture of 7-chloro,1,3-dihydro-3-[(2',3'-isopropylidenedioxy) propoxy]-5-phenyl-2H-1,4-benzodiazepin-2-one and 7-chloro-1,3-dihydro-3- (2',3'-dihydroxypropoxy)-5-phenyl-2H-1,4-benzodiazepin-2-one in the ratio of 3:1). The mixture was separated by chromatography on a column of silica gel. Analytically pure 7-chloro-1,3-dihydro-3-[(2',3'-isopropylidenedioxy) propoxy]-5-phenyl-2H-1,4-benzodiazepin-2-one was obtained, m.p. 210°–211°C.

| Analysis | $C_{21}H_{21}ClN_2O_4$ | | (400.955) | |
|---|---|---|---|---|
| Calculated: | C 62.90%, | H 5.28%, | N 6.99% | |
| Found: | C 63.20%, | H 5.27%, | N 6.89% | |

The substance was very soluble in chloroform, benzene, ethanol, methanol, acetone and ethyl acetate, slightly soluble in ether and insoluble in water and petroleum ether. Thin-layer chromatography : ether-petroleum ether-methanol (4:4:1), HF-SiO₂, UV₂₅₄, $R_f \cong 0.40$.

EXAMPLE 10

7-chloro-1-methyl-3-(2',3'-dihydroxypropoxy)-1,3-dihydro-5-phenyl-2H-1,4-benzodiazepin-2-one 7-chloro-1-methyl-3-[(2',3'-isopropylidendioxy) propoxy]-1,3-dihydro-5-phenyl-1,4-benzodiazepin-2-one (approx. 100 mg, m.p. 146°–148°C) was mixed at room temperature with approx. 15 ml of approximately 35% HCOOH (pH=1). After 30 minutes, the hydrolysis was completed. The solution was diluted with approx. 20 ml of water and neutralized with solid NaHCO₃ to approx. pH 5 and extracted with benzene. The extract was washed with water and dried over anhydrous Na₂SO₄.

The evaporated extract was, at first, a viscous oil which rapidly crystallized below a layer of ether-petroleum ether, 1:5 vol. The obtained product was 7-chloro-1-methyl-3-(2',3'-dihydroxypropoxy) -1,3-dihydro-5-phenyl-2H-1,4-benzodiazepin-2-one in a yield amounting to 98%, m.p. 199° to 202°C, which is analytically and chromatographically completely pure.

| Analysis | $C_{19}H_{19}ClN_2O_4$ | | (374.817) |
|---|---|---|---|
| Calculated | C 60.88%, | H 5.19%, | N 7.47% |
| Found | C 61.01%, | H 5.27%, | N 7.21% |

Soluble in $CHCl_3$, $C_6H_6$, $CH_2Cl_2$, EtOAc, MeOH, hot water, partially soluble in cold water.

EXAMPLE 11

7-chloro-1-methyl-3 -(2'3'-dihydroxypropoxy -1,3-dihydro-5-phenyl-2H-1,4-benzodiazepin-2-one 5 g (approx 12 mMol) of the mixture of 7-chloro-1-methyl-3-[(2',3'-isopropylidenedioxy) propoxy] -1,3-dihydro-5-phenyl-2H-1,4-benzodiazepin-2-one and 7-chloro-1-methyl-3-(2',3'-dihydroxypropoxy)-1,3-dihydro-5-phenyl-2H-1,4-benzodiazepin-2-one as obtained in Example 7 (in ratio 70:30, m.p. 115°–120°C) were dissolved in 70 ml of methanol with agitation and slight heating. 90 ml of 30% aqueous formic acid were added to the clear solution at room temperature and agitated for 5–6 hours. The solution was neutralized to pH 4–5 with solid $NaHCO_3$. The solution was concentrated (only to remove methanol; rotary evaporator, water bath 70°C). The aqueous solution was extracted 3 times with 50 ml portions of chloroform. The extract was washed with some water and dried overnight over anhydrous $Na_2SO_4$, and the chloroform evaporated. The yellow clear viscous oily substance was dissolved in approx. 15 ml of 96% ethanol, and 30 ml of ether were added thereto. The solution was carefully precipitated by injection of approx. 100 ml petroleum ether. This operation required several hours, using a refrigerator. The crystallization was complete after approx. 48 hours. Yield 3.6 g (85% of theory) of a fine crystalline white substance.

| Analysis | $C_{19}H_{19}ClN_2O_4$ | | |
|---|---|---|---|
| Calculated | C 60.88%; | H 5.19%; | N 7.47% |
| Found | C 61.01%; | H 5.27%; | N 7.21% |

The substance was very soluble in ethanol, methanol, acetone, chloroform and ethyl acetate. Slightly soluble in ether and benzene. The solubility in water was 0.5 g/l, and in 10% aqueous glycerol it was 1.6 g/l Thin-layer chromatography : ether-petroleum ether-methanol (4:4:1), $HF\text{-}SiO_2$, $UV_{254}$, $R_f \cong 0.10$

EXAMPLE 12

7-chloro-1,3-dihydro-1-methyl-3-(2',3'-dihydroxypropoxy-5-phenyl-2H-1,4-benzodiazepin-2-one 3,7-dichloro-1,3-dihydro-1-methyl-5-phenyl-2H-1,4-benzodiazepin-2-one (1.28 g, 4 mMol) was slowly added with agitation to a warm mixture of 4 ml of absolute DMF and 3 ml of absolute glycerol. The temperature of the oil bath was 50°–60°C. The mixture was agitated for another hour with heating. The clear yellow viscous solution was left for another 24 hours at room temperature. Then, approx. 50 ml of water were added to the mixture which was extracted 3 times with 20 ml portions of chloroform. The extract was washed with 10 ml of water and dried for several hours over anhydrous $Na_2SO_4$. The residue after evaporation of the solvent was a clear light yellow oily substance, which was dissolved in 5 ml of ethanol, then 15 ml of ether were added and the solution cooled. By addition of 40 ml of petroleum ether, the product precipitated slowly. Yield 1.05 g (70% of theory), m.p. 198°–200°C.

EXAMPLE 13

7-chloro-1,3-dihydro-3-(2',3'-dihydroxypropoxy)-5-phenyl-2H-1,4-benzodiazepin-2-one.

Starting with 7-chloro-1,3-dihydro-3- [(2',3'-isopropylidenedioxy)propoxy] -5-phenyl-2H-1,4-benzodiazepin-2-one, as prepared in Ex. 7 and using the same procedure as disclosed in Example 9, the product obtained was 7-chloro-1,3-dihydro-3-(2',3'-dihydroxypropoxy)-5-phenyl-2H-1,4-benzodiazepin-2-one in a yield of 98%, m.p. 212°to 215°C.

EXAMPLE 14

7-chloro-1,3-dihydro-3- (2',3'-dihydroxypropoxy) -5-phenyl-2H-1,4-benzodiazepin-2-one 5 g of 7-chloro-1,3-dihydro-3- [(2',3'-isopropylidenedioxy) propoxy] -5-phenyl-2H-1,4-benzodiazepin-2-one (which is, however, a mixture of 7-chloro-1,3-dihydro-3-(2',3'-dihydroxypropoxy) -5-phenyl-2H-1,4-benzodiazepin-2-one and 7-chloro-1,3-dihydro-3- [(2',3'-isopropylidenedioxy) propoxy]-5-phenyl-2H-1,4-benzodiazepin-2-one, 3:1), m.p. 175°–180°C was dissolved in a mixture of 70 ml methanol and 40 ml acetone, with gentle heating. 170 ml of 30% aqueous formic acid was added to this mixture at room temperature and agitated for another 5–6 hours. The solution was neutralized to pH 4–5 and then only the methanol and acetone were evaporated. The aqueous solution was extracted 3 times with 50 ml portions of chloroform, the chloroform extract was dried over $Na_2SO_4$ for 2–3 hours and evaporated. The residue was a light yellow clear oil, which was dissolved in 15 ml of 96% ethanol. By addition of 30 ml ether and cooling in a refrigerator, the product was precipitated by addition of approx. 100 ml of petroleum ether by injection (left in the refrigerator for 24 to 48 hours). 3.6 g of a white crystalline product (70% of theory) were obtained, m.p. 166°–168°C.

| Analysis: | $C_{18}H_{17}ClN_2O_4$ | | |
|---|---|---|---|
| Calculated: | C 59.91%, | H 4.73%, | N 7.76% |
| Found: | C 60.15%, | H 4.97%, | N 7.52% |

The substance was very soluble in methanol, ethanol, and acetone. Slightly soluble in chloroform and benzene, but insoluble in ether and petroleum ether. Solubility in water: 3—3.5 g/l, in aqueous glycerol it is 4–4.5 g/l. Thin layer chromatography : ether-petroleum ether-methanol (4:4:1), $HF\text{-}SiO_2$, $UV_{254}$, $R_f \cong 0.25$ (twice eluted), benzene-acetone (2:1), $HF\text{-}SiO_2$, $UV_{254}$, $R_f \cong 0.0$ (it remains at the beginning).

EXAMPLE 15

7-chloro-1,3-dihydro-1-methyl-3-(2'-hydroxyethoxy)-5-phenyl-2H-1,4-benzodiazepin-2-one 3.19 g (10 mMol) of 3,7-dichloro-1,3-dihydro-1-methyl-5-phenyl-2H-1,4-benzodiazepin-2-one was slowly added with agitation to 6 ml of ethanediol-1,2 which had been heated to 40°C. Then, the agitation was continued for another 15 minutes with simultaneous heating. The orange-yellow viscous solution was allowed to stand for 2–3 hours at room temperature. 50 ml of water were added to the suspension and extracted with three 30 ml portions of chloroform. The extract was washed with 50 ml of water and dried for 2 hours with anhydrous $Na_2SO_4$. The chloroform was evaporated and the crystalline yellow residue was dissolved in approx. 10 ml of chloroform. the product was precipitated from the solution under simultaneous cooling with petroleum ether (approx. 25 ml). 2.9 g (85% of theory) were obtained. After recrystallization from the same solution system, the product had a melting point of 217°–219°C.

| Analysis: | $C_{18}H_{17}ClN_2O_3$ | | (344.789) | |
| --- | --- | --- | --- | --- |
| | Calculated: | C 62.70% | H 4.97% | N 8.12% |
| | Found: | C 62.45% | H 5.25% | N 7.97% |

The substance was soluble in chloroform, acetone, methanol, ethanol and ethyl acetate. Slightly soluble in benzene and ether. Insoluble in water and petroleum ether. Thin-layer chromatography : Benzene-acetone (1:1, HF—$SiO_2$, $UV_{254}$, $R_f \cong 0.50$.

EXAMPLE 16

7-chloro-1,3-dihydro-3-(2'-hydroxyethoxy)-5-phenyl-2H-1,4-benzodiazepin-2-one 10 g (32,8 mMol) of 2,7-dichloro-1,3-dihydro-5-phenyl-2H-1,4-benzodiazepin-2-one were slowly added to 20 ml of warm ethanediol-1,2 (40°C) with agitation. Agitation was continued for an additional 15 minutes at a temperature of 40°C. The reaction mixture was left at room temperature for 2–3 hours. Subsequently thereto, 100 ml of water were added and extracted with three 50 ml portions of chloroform. Some crystals were precipitated. The extract was washed with 60 ml water, the layers thoroughly separated, and the chloroform solution evaporated (without previous drying). The yellow crystalline residue was heated to boiling with 80 ml of 96% ethanol and then placed in a refrigerator for 24 hours. The precipitate was filtered and washed with a little ethanol and ether. The yield was 7–8 g (65–75% of theory), m.p. 208°–210°C. The product was obtained from 96% ethanol or chloroform by precipitation with petroleum ether (1:2), m.p. 210°–212°C.

| Analysis | $C_{17}H_{15}ClN_2O_3$ | | (330.763) | |
| --- | --- | --- | --- | --- |
| | Calculated: | C 61.72%, | H 4.57%, | N 8.47% |
| | Found: | C 62.00%, | H 4.68%, | N 8.21% |

The substance was soluble in chloroform, methanol and ethanol. Slightly soluble in ethyl acetate, acetone and benzene. Insoluble in water, ether and petroleum ether. Thin-layer chromatography : benzene-acetone (1:2)—HF—$SiO_2$, $UV_{254}$, $R_f \cong 0.30$.

EXAMPLE 17

7-chloro-1,3-dihydro-3-(2'-hydroxyethoxy)-5-o-chlorophenyl-2H-1,4-benzodiazepine-2-one.

The procedure followed was the same as in Example 16, the only difference being that the starting material was 10 g of 3,7-dichloro-1,3-dihydro-5-o-chlorophenyl-2H-1,4-benzodiazepin-2-one. There were obtained 8–9 of product, m.p. 221°–223°C. The product was recrystallized, as in Example 5, m.p. 225°–226°C.

EXAMPLE 18

7-chloro-1,3-dihydro-1-methyl-3-(2',3'-dihydroxypropoxy)-5-o-chlorophenyl-2H-1,4-benzodiazepin-2-one.

In the same manner as in Example 12, but the starting material was 7-chloro-1,3-dihydro-1-methyl-5-o-chlorophenyl-2H-1,4-benzodiazepin-2-one. The product obtained had a melting point of 212°–214°C.

EXAMPLE 19

7-chloro-1,3-dihydro-1-methyl-3-trichloroacetoxy-5-phenyl-2H-1,4-benzodiazepin-2-one 3 g (10 mMol) of 7-chloro-1,3-dihydro-3-hydroxy-1-methyl-5-phenyl-1,4-benzodiazepin-2-one (TEMAZEPAM) was dissolved in a mixture of 6 ml of absolute pyridine and 4 ml of absolute acetone. To this cold solution (ice+NaCl+$H_2O$, temperature −15°C), there was added with shaking over a period of 5 to 10 minutes a solution of 3.5 ml of trichloroacetyl chloride in 5 ml of absolute ether. The mixture was left for 30 minutes at −15°C, and, subsequently, 150 ml of absolute ether was added and dissolved by standing for another 30 minutes at −15°C. Thereafter, the solution was allowed to stand for another 30 minutes at room temperature. The precipitate was separated by filtering and washed with a little ether. The ether solution was washed twice with 50 ml of water, then with 3% HCl to pH 2–3 and finally with water to pH 5 again. The extract was dried for 1 hour over anhydrous $Na_2SO_4$. The evaporated extract was crystallized from benzene and petroleum ether (1:2). Yield 2.53 g (60% of theory), m.p. 194°–196°C.

| Analysis | $C_{18}H_{12}Cl_4N_2O_3$ | | (446.120) | |
| --- | --- | --- | --- | --- |
| | Calculated: | C 48.46%, | H 2.71%, | N 6.28% |
| | Found: | C 48.68%, | H 2.93%, | N 6.26% |

The substance was very soluble in chloroform, acetone, ethanol, methanol and benzene. Slightly soluble in ether and ethyl acetate. Insoluble in petroleum ether. Thin-layer chromatography: ether, HF—$SiO_2$, $UV_{254}$, $R_f \cong 0.80$.

EXAMPLE 20

7-chloro-1,3-dihydro-3-trichloroacetoxy-5-phenyl-2H-1,4-benzodiazepin-2-one

2.86 g (10 mMol) of 7-chloro-1,3-dihydro-3-hydroxy-5-phenyl-2H-1,4-benzodiazepin-2-one (OXAZEPAM) was dissolved in a mixture of 20 ml of absolute pyridine and 10 ml of absolute acetone. To the cooled solution (ice bath, −15°C), there was added with shaking over a period of 5 to 10 minutes 3.5 ml of trichloracetyl chloride in 5 ml of dry ether. The mixture was held at −15°C for another 30 minutes, then 150 ml of anhydrous ether was added and the mixture allowed to stand at room temperature for another 30 minutes. The precipitate was separated by filtration, washed with some ether. The ether solution was washed twice with 50 ml of water, then with 3% HCl to pH 2-3 and, finally, with water again to pH 5. The extract was dried over anhydrous $Na_2SO_4$ for 2 hours. The purified extracts were evaporated to a yellow crystalline mixture. By recrystallization from benzene-petroleum ether (1:2), 2.29 g (50% of theory) of the product were obtained, m.p. 246°–248°C.

| Analysis | $C_{17}H_{10}Cl_4N_2O_3$ | | (432.094) | |
|---|---|---|---|---|
| Calculated: | | C 57.25% | H 2.33% | N 6.48% |
| Found: | | C 47.11% | H 2.40% | N 6.45% |

The substance was soluble in chloroform, ethanol, methanol and benzene, slightly soluble in ether and ethyl acetate, and insoluble in water and petroleum ether. Thin-layer chromatography: ether, HF—$SiO_2$, $UV_{254}$, $R_f \cong 0.80$.

EXAMPLE 21

7-chloro-1,3-dihydro-1-methyl-3-N-pyridyl-5-phenyl-2H-1,4-benzodiazepin-2-one chloride.

1.59 g (5 mMol) of 3,7-dichloro-1,3-dihydro-1-methyl-5-phenyl-2H-1,4-benzodiazepin-2-one was dissolved in 5 ml of anhydrous acetonitrile. 3 ml of absolute pyridine were added to this solution. The mixture was agitated for 24 hours under a reflux condenser on an oil bath (60°C). After cooling, 25 ml of ether were added and agitated for another several hours, whereby the crystals precipitated. The suction filtered crude product was dissolved in approx. 10 ml of methanol, decolorized with activated charcoal and filtered. The filtrate was evaporated to dryness. The residue was a colorless clear resinous material, which was covered with 15 ml of acetone. The mixture crystallized with slight heating and agitation. Yield 80% of theory, m.p. 228°–230°C (with decomposition).

| Analysis | $C_{21}H_{17}Cl_2N_3O$ | | (398.384) | |
|---|---|---|---|---|
| Calculated: | | C 63.30%, | H 4.30%, | N 10.54% |
| Found: | | C 62.11%, | H 4.64%, | N 10.14% |

EXAMPLE 22

7-chloro-1,3-dihydro-3-N-pyridyl-5-phenyl-2H-1,4-benzodiazepin-2-one chloride

10 g (32.8 mMol) of "3-CHLOROOXAZEPAM" was dissolved in 15 ml of absolute pyridine. The reaction mixture was left at room temperature for 4 hours. During this period, white crystals precipitated. Then, 100 ml of dry ether were added, well mixed, and left at room temperature for several more hours. The precipitate was filtered by suction, washed with ether and dried in air. There were obtained 11.4 g of a white precipitate (theory 12.6 g). The crude product was dissolved in approximately 30 ml of methanol with slight heating, activated charcoal added and filtered. The methanolic filtrate was evaporated. The residue, a colorless clear resinous substance was dissolved in approx. 30 ml of hot water and left at room temperature for 24 hours. There were obtained 10 g of the product. An analytically pure substance was obtained by recrystallization from hot water, m.p. 234°–236°C with decomposition.

| Analysis: | $C_{20}H_{15}Cl_2N_3O$ | | (384.258) | |
|---|---|---|---|---|
| Calculated: | | C 62.51%, | H 3.93%, | N 10.93% |
| Found: | | C 62.50%, | H 4.05%, | N 11.16% |

The substance was soluble in methanol, ethanol and water, insoluble in other solvents.

EXAMPLE 23

7-chloro-1,3-dihydro-3-N-nicotinamido-5-phenyl-2H-1,4-benzodiazepin-2-one chloride

6.1 g (20 mMol) of 3,7-dichloro-1,3-dihydro-5-phenyl-2H-1,4-benzodiazepin-2-one were added to 40 ml of absolute acetonitrile with agitation and heated under reflux for 15 minutes (oil bath at approx. 70°C). 2.44 g (21 mMol) of nicotinamide was added to this solution and the agitation are heating continued for another 2 hours. Then, the agitation was continued for another 2 hours at room temperature. The precipitate was filtered by suction and washed with ether and dried in air. The product was recrystallized from methanol-ether (1:2), m.p. 244°–246°C (with decomposition). The product was soluble in water, methanol and ethanol, insoluble in other solvents.

EXAMPLE 24

7-chloro-1,3-dihydro-1-methyl-3-N-nicotinamido-5-phenyl-2H-1,4-benzodiazepin-2-one chloride.

3.19 g (10 mMol) of 3,7-dichloro-1,3-dihydro-1-methyl-5-phenyl-2H-1,4-benzodiazepin-2-one were dissolved in 15 ml of absolute acetonitrile, 1.22 g (10 mMol) of nicotinamide were added thereto. The reaction mixture was heated and agitated for 24 hours (oil bath approximately 60°C). 40 ml of ether were added to the cooled solution, slowly and with agitation. The precipitate was intensively stirred for several hours. The crude product was recrystallized from acetone, m.p. 205°–207°C (with decomposition). The substance was very soluble in water, ethanol and methanol, slightly soluble in acetone and insoluble in other solvents.

EXAMPLE 25

The method used was the same as used in Examples 21, 22, 23 or 24, but the starting products were various heterocyclic amines. The following products were obtained:

7-chloro-1,3-dihydro-1-methyl-3-(N-methylmorpholino)-5-phenyl-2H-1,4-benzodiazepin-2-one chloride, m.p. 223°–225°C (with decompostion)

7-nitro-1,3-dihydro-1-methyl-3-(1-methyl-3-ethylmorpholino)-5-phenyl-2H1,4-benzodiazepin-2-one chloride, m.p. 235°–237°C (with decomposition)

7-methoxy-1,3-dihydro-1-methyl-(N-methylpiperidino)-5-o-chlorophenyl-2H-1,4-benzodiazepin-2-one chloride, m.p. 218°–220°C (with decomposition)

7-chloro-1,3-dihydro-1-methyl-3-(N-methylethylimino)-5-phenyl-2H-1,4-benzodiazepin-2-one chloride, m.p. 200°–202°C 7-chloro-1,3-dihydro-1-methyl-3-[N-methyl-5-ethyl-3-(2'-hydroxyethyl)-morpholino]5-phenyl-2H-1,4-benzodiazepin-2-one, m.p. 198°–200.5°C.

7-chloro-1,3-dihydro-1-methyl-3-(2-methylpyrimidino)-5-phenyl-2H-1,4-benzodiazepin-2-one, m.p. 230°–232°C (with decomposition).

We claim:
1. A compound having the formula

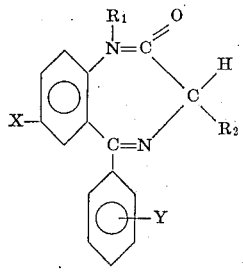

wherein $R_1$ represents a hydrogen atom or an alkyl group having at most 4 carbon atoms.

$R_2$ represents an alkoxy group having at most 6 carbons atoms and at least one hydroxyl group or a vicinal isopropylidenedioxy group; or a trihaloacetoxy group;

X represents a hydrogen atom, a halogen atom, a methoxy group, a nitro group or a trifluoromethyl group and Y represents a hydrogen atom, a halogen atom or a tri-fluoromethyl group.

2. A compound according to claim 1 where $R_2$ is

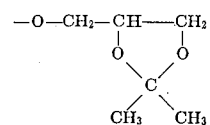

3. A compound according to claim 1 where $R_2$ is

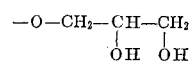

4. A compound according to claim 1 where $R_2$ is

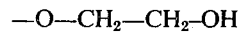

5. A compound according to claim 1 wherein $R_2$ is a trihaloacetoxy group.

6. A method for the preparation of a compound of the formula

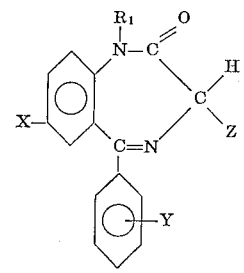

wherein
$R_1$ represents a hydrogen atom or a lower alkyl group,
X represents a hydrogen atom, a halogen atom, a lower alkoxy group, a nitro group or a trifluoromethyl group and
Y represents a hydrogen atom, a halogen atom or a trifluoromethyl group and
Z represents a halogen atom which comprises reacting a compound of formula II wherein Z represents an hydroxyl group with excess thionyl chloride at a temperature of −5°C., evaporating off excess thionyl chloride, evaporating traces of thionyl chloride with benzene under vacuum and adding ether to the residue to form crystals of compound II where Z is halogen.

* * * * *